United States Patent [19]

Campbell et al.

[11] Patent Number: 5,197,128
[45] Date of Patent: Mar. 23, 1993

[54] MODULAR INTERFACE

[75] Inventors: Russell Campbell; Todd A. Fischer; Patrick W. Fulghum, all of Boise, Id.; Paul R. Sorenson, San Diego; James G. Wendt, Auburn, both of Calif.

[73] Assignee: Hewlett-Packard Company, Palo Alto, Calif.

[21] Appl. No.: 663,977

[22] Filed: Mar. 4, 1991

[51] Int. Cl.$^5$ .............................................. G06F 13/12
[52] U.S. Cl. .................. 395/275; 364/238.3; 364/239.3; 364/239.7
[58] Field of Search ............... 395/275; 364/238.3, 364/239.3, 239.7

[56] References Cited

U.S. PATENT DOCUMENTS

| | | | |
|---|---|---|---|
| 4,603,385 | 7/1986 | Mueller et al. | 364/200 |
| 4,731,735 | 3/1988 | Bongendale et al. | 364/200 |
| 4,924,456 | 5/1990 | Maxwell et al. | 370/32 |
| 4,943,942 | 7/1990 | Dunnion | 364/900 |
| 4,994,988 | 2/1991 | Yokoi | 395/112 |
| 5,065,343 | 11/1991 | Inoue | 395/162 |
| 5,086,503 | 2/1992 | Chung et al. | 395/700 |

Primary Examiner—Dale M. Shaw
Assistant Examiner—Diane E. Smith

[57] ABSTRACT

A packet-based communication system is described for linking a peripheral unit (PU) to the outside world via a communications link. The system includes a modular interface unit (MIU) which has a memory shared by processors in both the PU and MIU. The system employs control packets, read packets and write packets and performs a method for allocating the shared memory that optimizes memory utilization. The system determines a ratio of read to write packets required in the operation of the PU, and it ignores that ratio if the communications link will not transmit write packets. If the communication link will transmit write packets, it allocates read and write packet space within the shared memory in accordance with the ratio. The system also includes apparatus for enabling MIU configuration via user/keyboard inputs through the PU with the MIU providing the question and answer messages. This feature allows the PU to adapt to many different communication links, simply by replacement and user configuration of the MIU. The system further includes apparatus for rapidly handling network protocol headers. Those headers are stored along with the data packets and when the packet is accessed by the PU from shared memory, pointers are employed to enable access of only the data portions of such packets while ignoring the network protocol header portions.

15 Claims, 9 Drawing Sheets

MODULAR INTERFACE

FIELD OF THE INVENTION

This invention relates to interface units that enable communications between peripheral units and other apparatus and, more particularly, to a modular interface unit that enables personalization of interface functions for a peripheral unit without the peripheral unit requiring knowledge of the interface functions.

BACKGROUND OF THE INVENTION

In today's marketplace, peripheral units such as printers, facsimile units, plotters, etc., need to be able to communicate with many different entities, i.e., local area networks, individual personal computers, wide area networks, etc. No longer is it sufficient to provide a peripheral unit with a single communications interface, as that greatly reduces its potential market.

As a result, prior art peripheral units exist with modular interface units that are card-mounted and may be changed by simple substitution of another modular interface card. In general, such interface units allow peripheral unit-to-outside world communications through the use of packet-arranged data blocks in the well known manner. Individual interface units are thus able to provide interface functionality with networks and handle the network protocol headers. Such interface units insert and modify interface headers used between the interface unit and a connected peripheral unit. If the peripheral unit is to communicate directly with one computer, the interface unit is simply provided with the capability of handling interface unit protocol and does not have the ability (or the need) to handle network protocol headers.

One such modular interface unit was incorporated in the Hewlett-Packard 2563 family of line printers and provided required interface functions on a single, removable card. That card included both a processor and a random access memory, which memory was shared and accessible by both the interface unit's processor as well as a processor in the printer.

Figure 1:
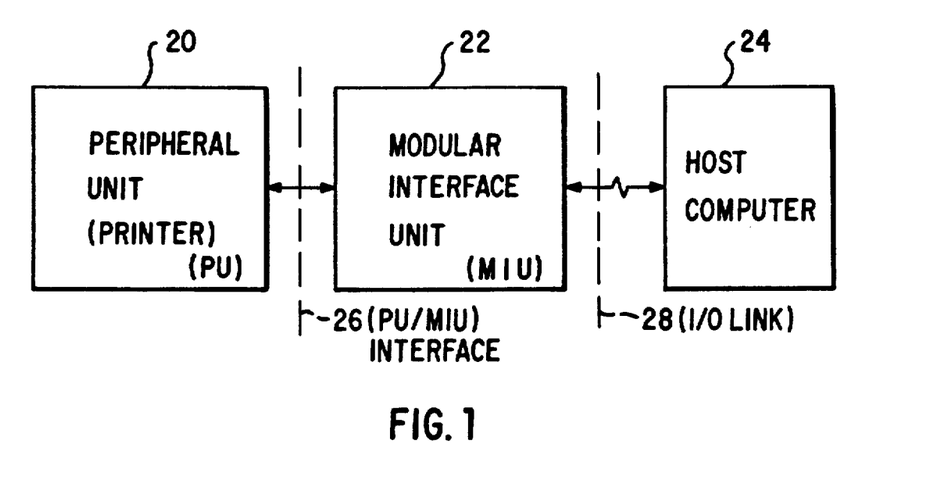
FIG. 1 is a high level block diagram of a system including a modular interface unit for communications control.

In FIG. 1, a high level block diagram indicates the overall system's arrangement and includes peripheral unit (PU) 20 (e.g., a printer), a modular interface unit (MIU) 22 and a host computer 24. Dotted line 26 between PU 20 and MIU 22 indicates the MIU/PU interface and the dotted line 28 indicates an I/0 hardware link connecting MIU 22 to host computer 24. All communications (except for certain control line functions) occur between the MIU 22 and PU 20 through a shared memory in MIU 22.

The prior art system of FIG. 1 communicates through a use of data and control packets and employs a request/response protocol. Both the data and control packets include header and buffer portions, with the header arrangement generally indicated in FIG. 2. The first 8 bytes in the header (0-7) are device specific and are not for communicating information between PU 20 and MIU 22. The following seven fields in the header contain specific communication information. Bytes 8 and 9 include Command and Command Modifier fields that indicate an action to be performed, such as: set the peripheral's display, self test, read data into peripheral unit, write data to a connected computer etc. The Return status field follows and contains an indication of the results of performing an action prescribed by the Command and Command Modifier fields. The Start of Data field indicates the address of the beginning byte of the buffer associated with the particular header. The Data Length field indicates the number of bytes of valid data in the buffer and the Max Data Length field indicates the total number of bytes available in the packet's buffer.

Figure 3:
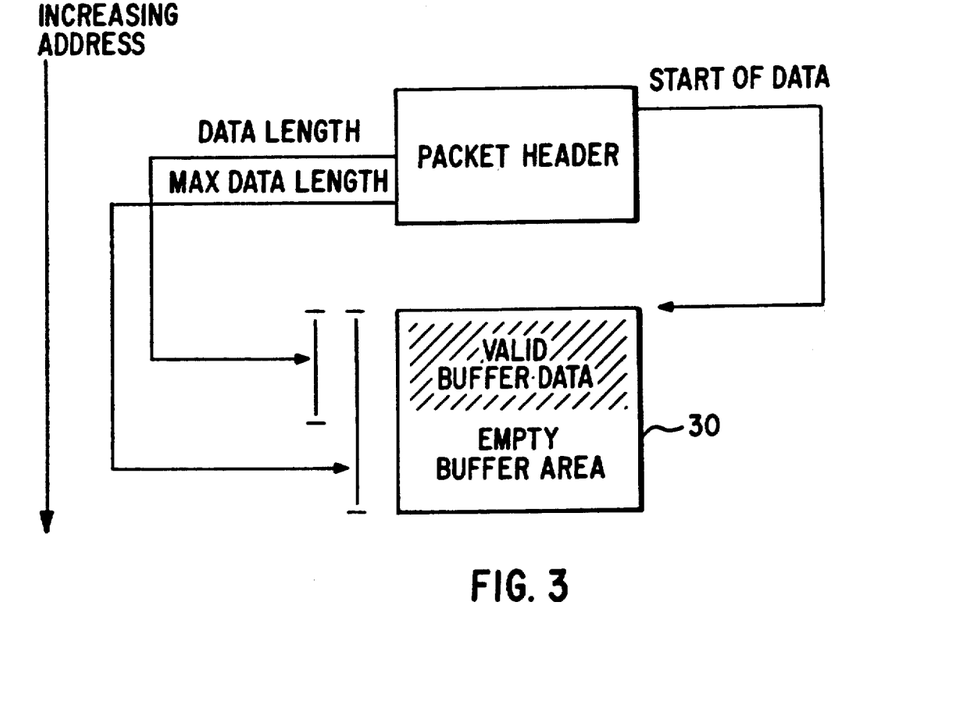
FIG. 3 is a schematic showing how fields in the prior art packet header refer to various sections of an associated packet buffer.

In FIG. 3, representations of Start of Data, Data Length, and Max Data Length fields are shown as they apply to a buffer. The Start of Data field indicates the initial address of buffer 30; the Data Length field indicates the length of valid data in buffer 30; and the Max Data Length field indicates the entire data length of buffer 30 and encompasses both valid data and empty buffer areas.

In the 2563 printer, referred to above, buffer 30 had a prescribed length for control packets and was appended directly to the header. Buffer 30 held the substantive information being communicated within the system in accordance with the header's directions. The fixed length of the buffer presented difficulties. It constrained the flexibility of the system to accommodate more detailed control commands that required additional, non-available buffer space. The fixed size of the buffer also prevented the system from adapting to changed requirements imposed by the peripheral unit or the interface unit. Additionally, the fixed buffer size presented constraints when attempting to extend the interface standard to new network configurations and packet structures.

While the provision of such replaceable interface units provided greater flexibility for peripheral unit-to-outside world communications, problems were created by the separation of the interface function from the peripheral unit's function. In specific, before a peripheral unit and associated interface unit could communicate with an outside network or computer, certain configuration inputs needed to be provided to the interface unit to enable communications to occur. For instance, if the interface unit was to communicate via a serial port, inputs were required specifying the baud rate, number of data bits per character, type of hand shaking, polarity of the line, etc. Characteristically, those inputs were implemented by the user opening the peripheral's case and setting switches in accordance with instructions from a manual. At best, this was awkward, and at worst, a mistake would completely prevent communications from occurring.

As the availability of local area networks and other multi-user networks increased, the requirement for interface units to handle network protocol headers and trailers has also increased. So long as those headers were received over relatively slow communication lines or were received over network where the inflow of data could be selectively controlled, the protocol headers could be stripped on-the-fly by the interface unit and system performance was not degraded. However, with the advent of new networks having high speed "nonstoppable" data flows, such intermediate protocol header processing has become difficult to achieve in a cost-effective manner. Thus, interface units have had to become increasingly complex and costly to handle such network protocol headers.

It is therefore an object of this invention to provide a modular interface unit for a peripheral unit that exhibits improved shared-memory operation.

It is another object of this invention to provide a modular interface unit that enables user-friendly configuration of the interface unit.

It is still another object of this invention to provide a modular interface that provides improved handling of network protocol headers and trailers.

SUMMARY OF THE INVENTION

A packet-based communication system is described for linking a peripheral unit (PU) to the outside world via a communications link. The system includes a modular interface unit (MIU) which has a memory shared by processors in both the PU and MIU. The system employs control packets, read packets and write packets and performs a method for allocating the shared memory that optimizes memory utilization. The system determines a ratio of read to write packets required in the operation of the PU, and it ignores that ratio if the communications link will not transmit write packets. If the communication link will transmit write packets, it allocates read and write packet space within the shared memory in accordance with the ratio. The system also includes apparatus for enabling MIU configuration via user/keyboard inputs through the PU with the MIU providing the question and answer messages. This feature allows the PU to adapt to many different communication links, simply by replacement and user configuration of the MIU. The system further includes apparatus for rapidly handling network protocol headers and trailers. Those headers and trailers are stored along with the data packets and when the packet is accessed by the PU from shared memory, pointers are employed to enable access of only the data portions of such packets while ignoring the network protocol header and trailer portions.

DETAILED DESCRIPTION OF THE INVENTION

Figure 4:
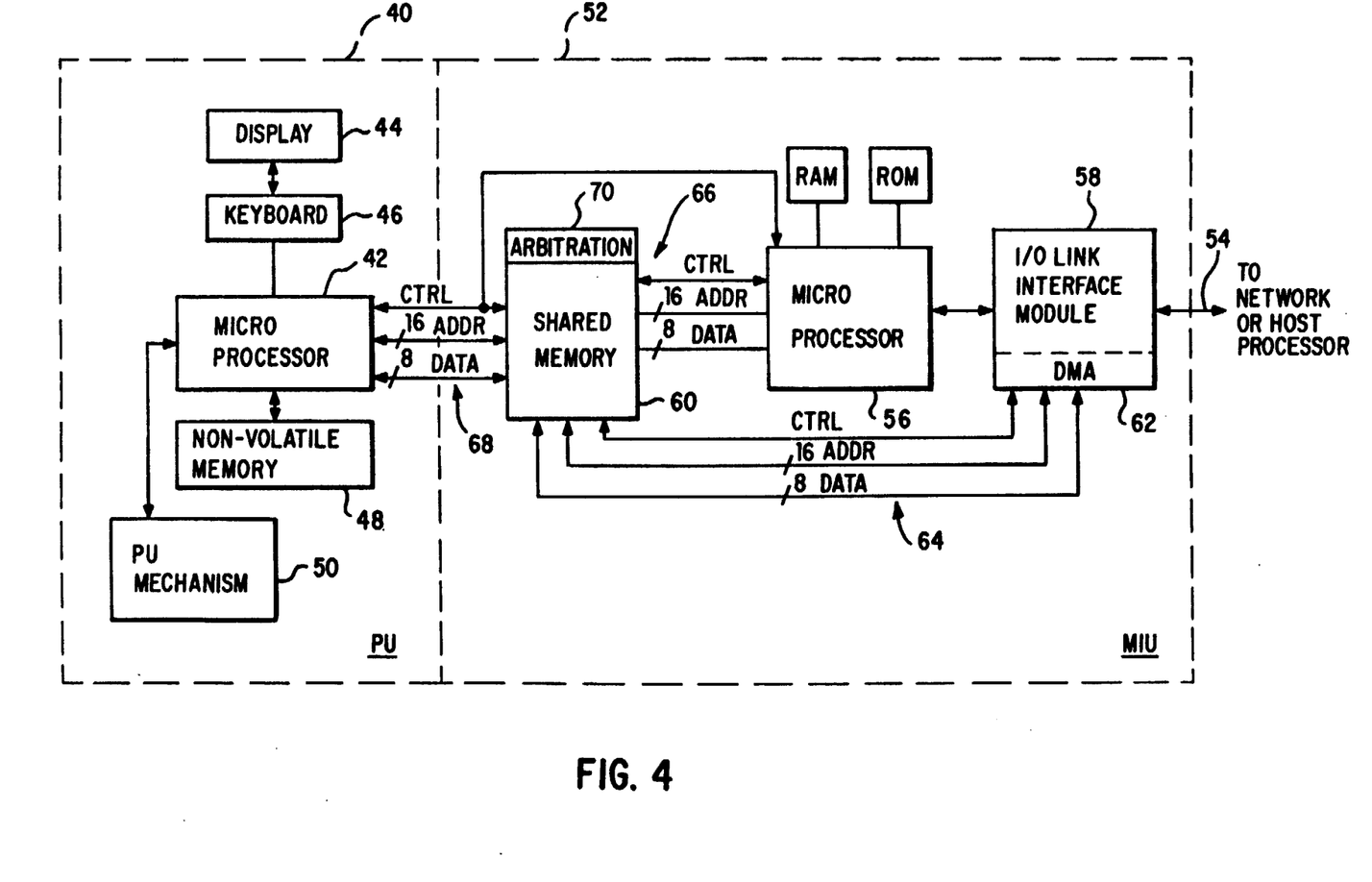
FIG. 4 is a block diagram of a system incorporating the invention.

Referring now to FIG. 4, a block diagram is shown of a system incorporating the invention. PU 40 may be a printer, facsimile, plotter or other peripheral unit that is adapted to communicate with either a network or host processor. PU 40 is controlled by a microprocessor 42 in the well known manner. A display 44 is provided with a keyboard 46, both of which interact with microprocessor 42 to provided user input/output functions. A non-volatile memory 48 provides firmware storage for microprocessor 42, and other memory (i.e., RAM, ROM) not shown, contain other operating storage for microprocessor 42. A PU mechanism 50 is operated by microprocessor 42 to perform the PU function. Assuming that PU 40 is a printer, PU mechanism 50 would comprise the printer mechanism and electronics for controlling the mechanism in response to instructions from microprocessor 42.

Communications between PU 40 and the outside world are funneled through an MIU 52 which performs all interface functions to enable PU 40 to communicate with either a network or host processor via an input-/output link 54. MIU 52 includes a microprocessor 56 which controls the operation of MIU 52 and enables it to perform its interface functions. Microprocessor 56 is provided with local RAM (optional) and ROM for operating data storage. The other main components of MIU 52 are an I/O link interface module 58 and a shared memory 60.

The system of FIG. 4 operates in a packet-based mode. Each packet contains (1) a packet header which is the portion of a packet that transfers command, status, and data location information and (2) a packet buffer which is the portion of a packet that transfers data or messages.

I/O link interface module 58 functions to both direct out-going data onto link 54 and to receive incoming data therefrom. Module 58 directs incoming packets either directly to microprocessor 56 or through a direct memory access (DMA) submodule 62 into shared memory 60. If interface module 58 only supports low data rates (e.g., an RS232 link operating at 9600 bits per second), DMA submodule 62 is not required. In such a case, incoming data packets are buffered in interface module 58, are read by microprocessor 56 and then moved into shared memory 60. On the other hand, if interface module 58 functions to interface to a network that employs a high data rate (e.g. a token ring data rate of 16 megabits per second), then DMA submodule 62 comes into play. In such case, microprocessor 56 instructs interface module 58 to store the next valid packet into a given address in shared memory 60. That address is placed in a DMA counter (not shown) in DMA submodule 62. When the packet is received, it is directly stored starting at the designated address in shared memory 60. These actions take place over control, address and data lines 64 that extend between DMA submodule 62 and shared memory 60. Identical groups of lines 66 and 68 extend between shared memory 60 and microprocessors 56 and 42 respectively. It can thus be seen that shared memory 60 can receive direct input from DMA 62 and is fully accessible from both microprocessors 42 and 56. As a result, shared memory 60 is, in essence, shared between PU 40 and MIU 52 and forms the chief information pathway between these two units. An arbitration submodule 70 settles conflicts, if more than one entity attempts, at the same time, to access shared memory 60.

All routing of data from PU 40 is accomplished in MIU 52 and PU 40 has no built-in knowledge of either the protocols employed by MIU 52 to communicate with the outside world or the characteristics of incoming data from the outside world. As a result, PU 40 can be interfaced with any network protocol or specific host processor by simply changing MIU 52.

Figure 2:
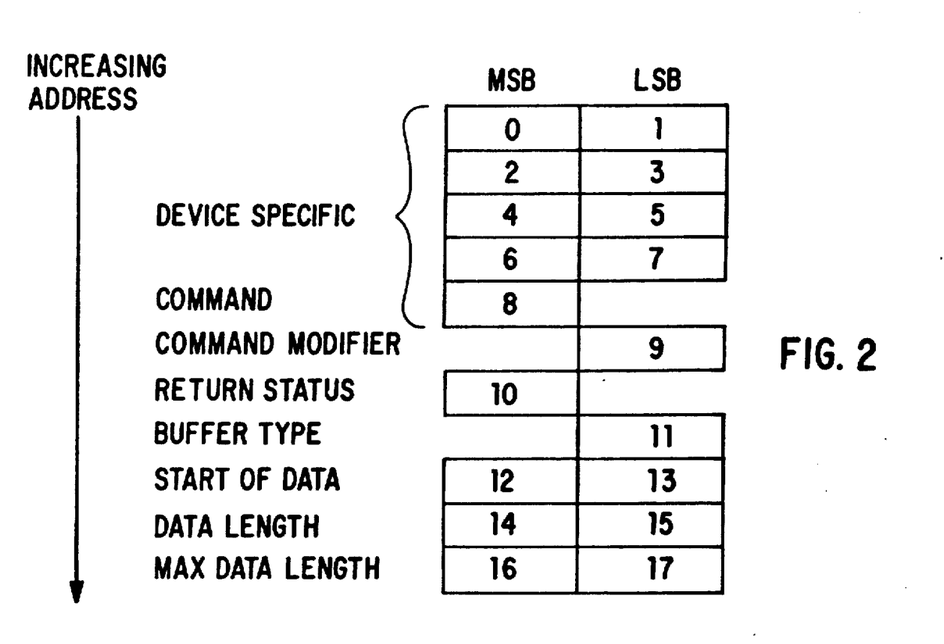
FIG. 2 is a schematic indication of a packet header used both in the prior art and with this invention.

The packet structure employed by the system of FIG. 4 is substantially identical to that shown in FIG. 2. Although there are many types of packets, four specific types of packets will be hereinafter considered as they support the communications between PU 40 and MIU 52. Those packets are as follows:

data read packet—this packet is used to pass data from the outside world to PU 40. If PU 40 is a printer, the data read packet will often include information to be processed into a print page and thereafter printed.

data write packet—this packet is used to pass data from PU 40 to the outside world. If PU 40 is a printer, there is often little call for data write packets as the major data flow is from the outside world to the printer rather than vice versa. In fact, one widely used printer interface has no capability to pass data from a printer to the host processor (i.e., Centronics protocol).

PU control packet—this packet is used for miscellaneous PU to MIU request/response information transfers. Such packets are generally used for control and internal housekeeping functions within the system.

MIU control packet—this packet is intended to be used for miscellaneous MIU to PU request/response information transfers.

The PU and MIU control packets enable intra-system communication of control commands. To assure the availability of bi-directional control packet communications, during initial setup, at least two packets are assigned as MIU control packets and at least two additional packets are assigned as PU control packets. Areas within shared memory 60 are reserved for these packets and they thus provide "windows" wherein control information can always be passed between PU 40 and MIU 52 and vice versa.

The system of FIG. 4 employs the concept of "possession" of a packet by either PU 40 or MIU 52. Only the possessor of the packet has access to it. Thus, while packets reside in shared memory 60, they may only be accessed by their possessor and not by the other party that has access to shared memory 60. Possession is transferred between PU 40 and MIU 52 through the use of "mailboxes" within shared memory 60. Four bytes in shared memory 60 are reserved as a PU mailbox and four bytes are reserved as an MIU mailbox. Each of those mailboxes includes a flag bit to indicate the presence of valid data within the mailbox.

Possession of a packet is transferred by the possessor by storing a pointer to the packet's header in the non-possessor's mailbox. The possessor sets the aforesaid flag bit in the non-possessor's mailbox to the valid state. The possessor then, through the operation of a hard-wired control line, interrupts the non-possessor and the non-possessor then interrogates its mailbox and sees the set flag. Then, the non-possessor retrieves the packet header pointer previously stored in the non-possessor's mailbox at which point the non-possessor becomes the possessor of the packet and vice versa. At this stage, the new possessor now has access to the packet and its stored data. The new possessor clears the flag in the mailbox and then interrupts the new non-possessor through a hard-wire control line. This then enables the non-possessor to initiate a new transfer of possession of additional packets, should it so desire.

As above stated, shared memory 60 is the sole data pathway between PU 40 and the outside world. In the initial configuration of the system of FIG. 4, shared memory 60 is configured. Certain of its storage space is allocated to control packets (as aforesaid); certain of its storage space is allocated to read data packets and certain more of its storage space is allocated to write data packets. Under certain circumstances, shared memory 60 may have none of its storage space allocated to write data packets (to be hereinafter discussed).

Shared memory 60 may therefore be looked at as a "window" through which data and control communications pass. A portion of the window is reserved for incoming read data from the outside world and another portion may be reserved for outgoing write data to the outside world. By allocating portions of shared memory 60 as aforestated, it is assured that bi-lateral communications will always be possible, even when an overwhelming amount of data is flowing in a uni-lateral direction (e.g., incoming). Thus, a portion of the window will always be reserved for outgoing packets and will not be accessible to incoming data.

Since the allocation of memory space in shared memory 60 is so important to the optimum functioning of the system of FIG. 4, a very detailed allocation process occurs during the initial configuration of the system which process is described in the flow diagram of FIGS. 5-9.

SHARED MEMORY ALLOCATION

The MIU controls the shared memory allocation procedure. The shared memory allocation procedure commences by first determining the read/write data packet mix required by PU 40. For instance, if PU 40 is a printer, it will overwhelmingly require read data packet space in shared memory 60 and will require little, if any, write data packet space.

If on the other hand, PU 40 is a facsimile, then its read/write data packet mix will be approximately 50/50. As shown in box 100 FIG. 5, MIU 52 initially requests a read/write data packet mix ratio from PU 40. PU 40 inquires into its firmware for a pre-entered read/write data packet mix ratio, that ratio being based on the communication characteristics of PU 40, as aforedescribed (box 102). PU 40 then replies to MIU 52 and provides the requested data packet mix ratio (box 104).

Figure 5:
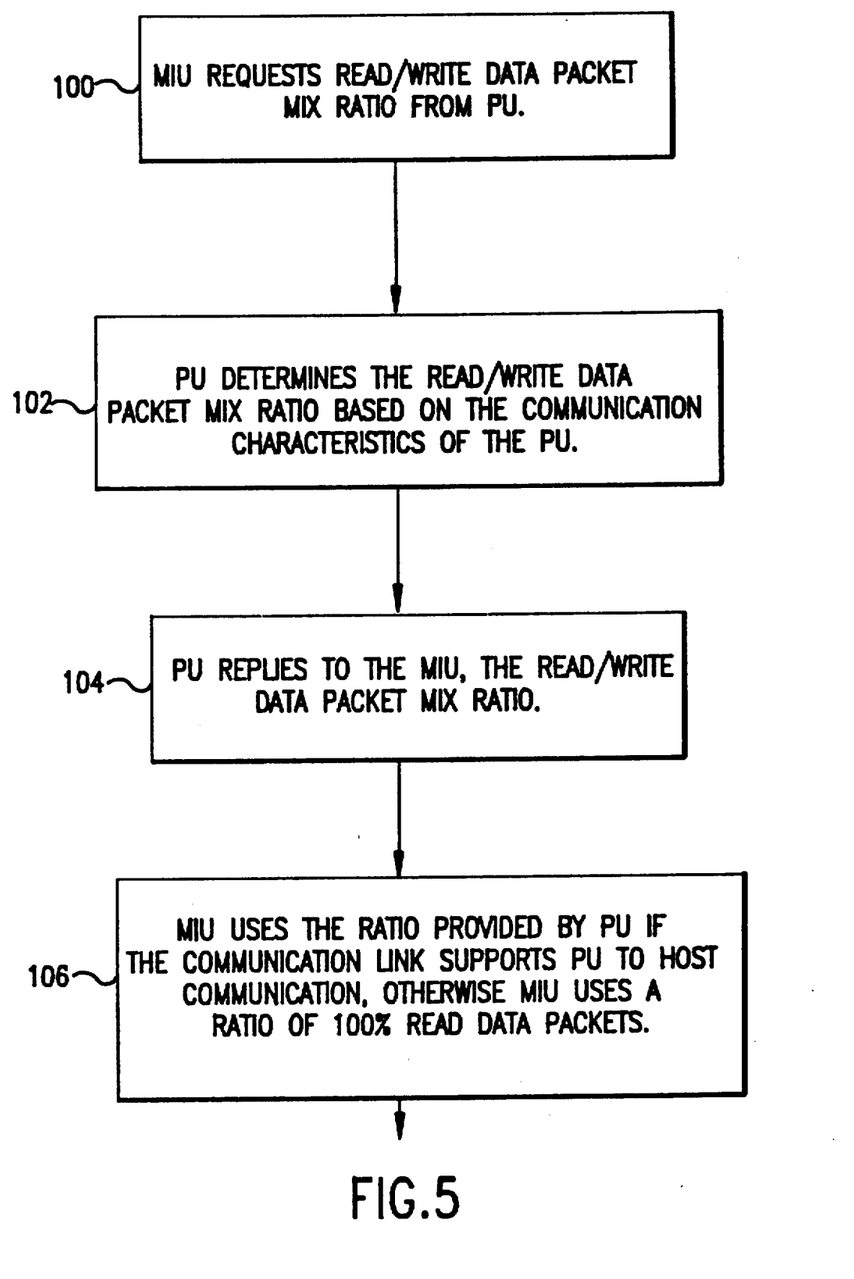
FIG. 5 is a high level flow diagram showing how the MIU determines the read/write data packet mix.

MIU 52 employs the ratio provided by PU 40 only if communication link 54 supports PU to host communications. If link 54 is of the Centronics type, then it will not support such PU to host communications. For this reason, there will be no reason to have any allocation of shared memory for write data packets. In such case, MIU 52 uses a ratio of 100% read data packets (box 106). The use of this ratio will become apparent from the description below.

Figure 6:
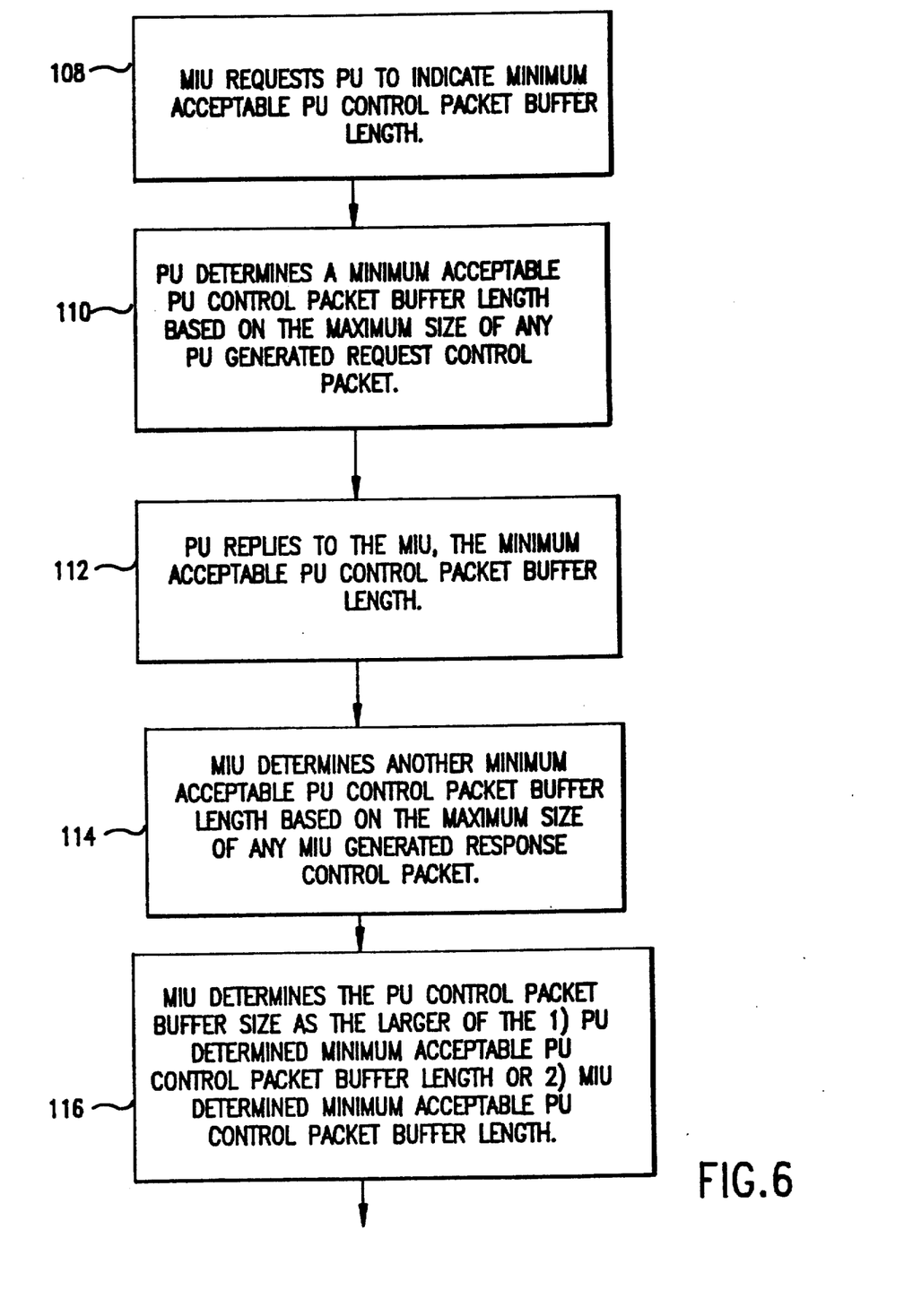
FIG. 6 is a high level flow diagram showing the method for determining PU control packet buffer length.

As shown in FIG. 6, MIU 52 then proceeds to determine the required length of buffer space for PU control packets. Initially, MIU 52 requests PU 40 to indicate the minimum acceptable PU control packet buffer length (box 108). PU 40, in response, examines its control commands and determines from the buffer information required thereby, a minimum acceptable PU control packet buffer length. In other words, that buffer length is based on the maximum size of any PU generated request control packet (box 110). This accomplishes the answer to one-half of the problem.

The other aspect of the problem is that the PU control packet buffers will also be used to receive response control packet buffers from MIU 52. Thus, the minimum size buffer must accommodate the maximum MIU response control packet buffer length. Thus, once PU 40 replies to MIU 52 and provides it a the minimum acceptable control packet buffer length (box 112), MIU 52 continues by determining another minimum acceptable PU control packet buffer length. This buffer length is based on the maximum size of any MIU generated response control packet buffer (box 114).

At this point, MIU 52 then determines the PU control packet buffer size as the larger of (1) the PU-determined minimum acceptable PU control packet buffer length, or (2) the MIU-determined minimum acceptable MIU response packet buffer length. At this point, MIU 52 has established the minimum acceptable buffer length for PU control packets.

Figure 7:
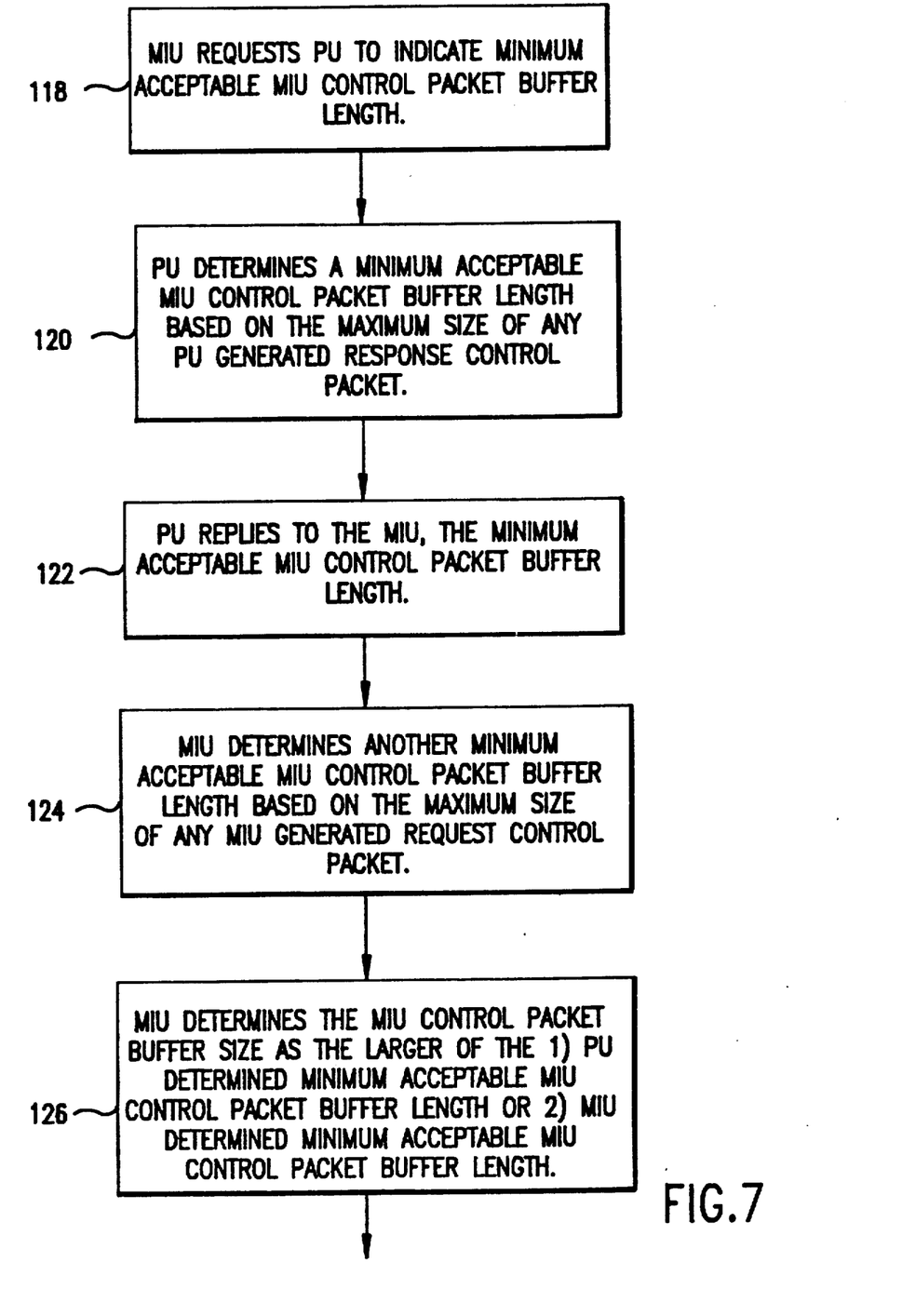
FIG. 7 is a high level flow diagram showing the method for determination of MIU control packet buffer length.

As shown in FIG. 7, MIU 52 now accomplishes the same determination for its control packet buffer length. That determination is made as shown in boxes 118, 120, 122, 124 and 126. It is identical to that shown in FIG. 6 accept that MIU 52 commences its determination by initially examining the maximum size of any PU-generated response control packet buffer and then examines the maximum size of any MIU-generated request control packet buffer. The larger of those two buffer sizes then controls the MIU control packet buffer length.

Figure 8:
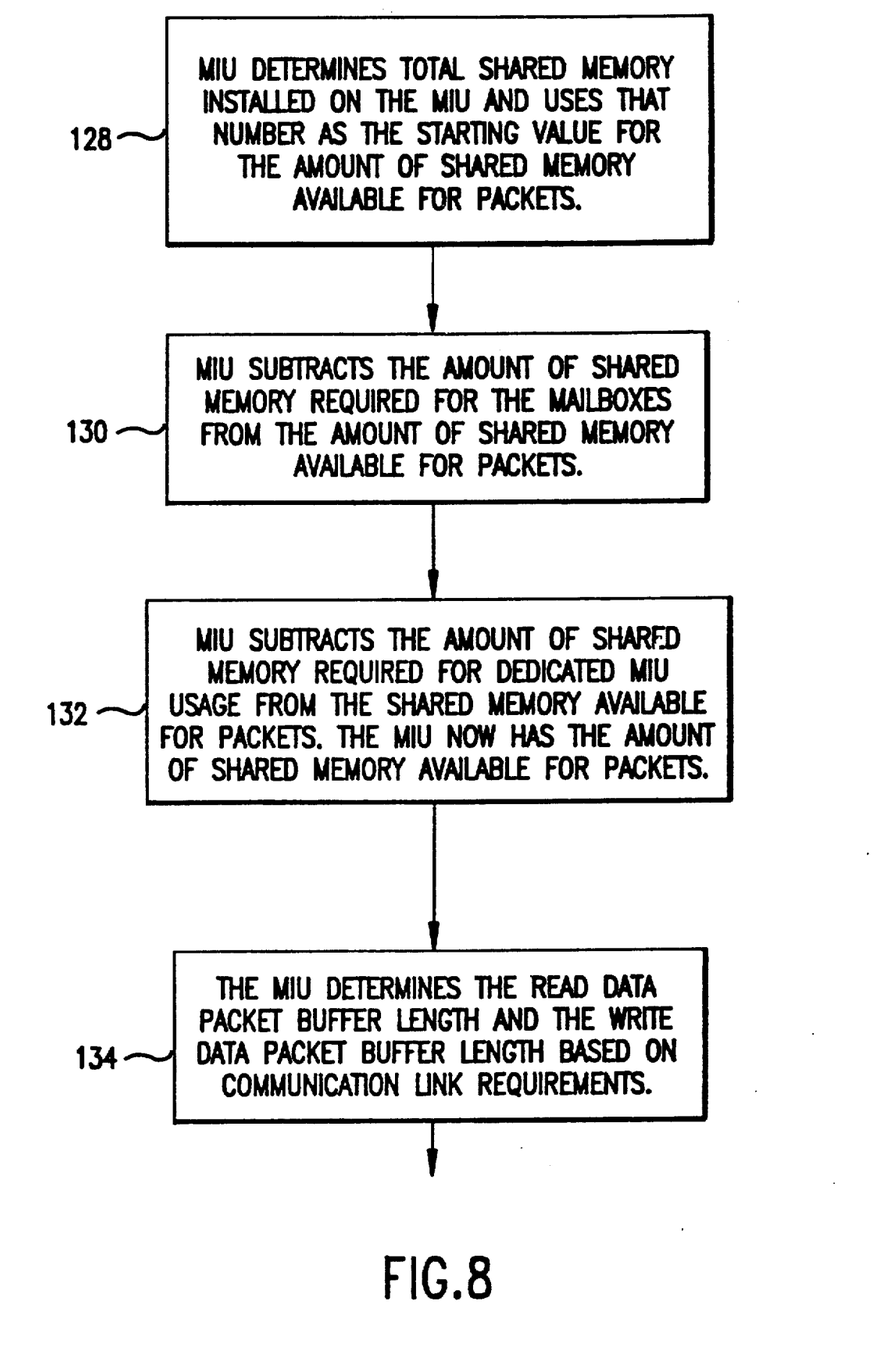
FIG. 8 is a high level flow diagram which both indicates the method for determining the amount of shared memory available for packets and how buffer lengths for read and write data packets are determined.
Figure 9:
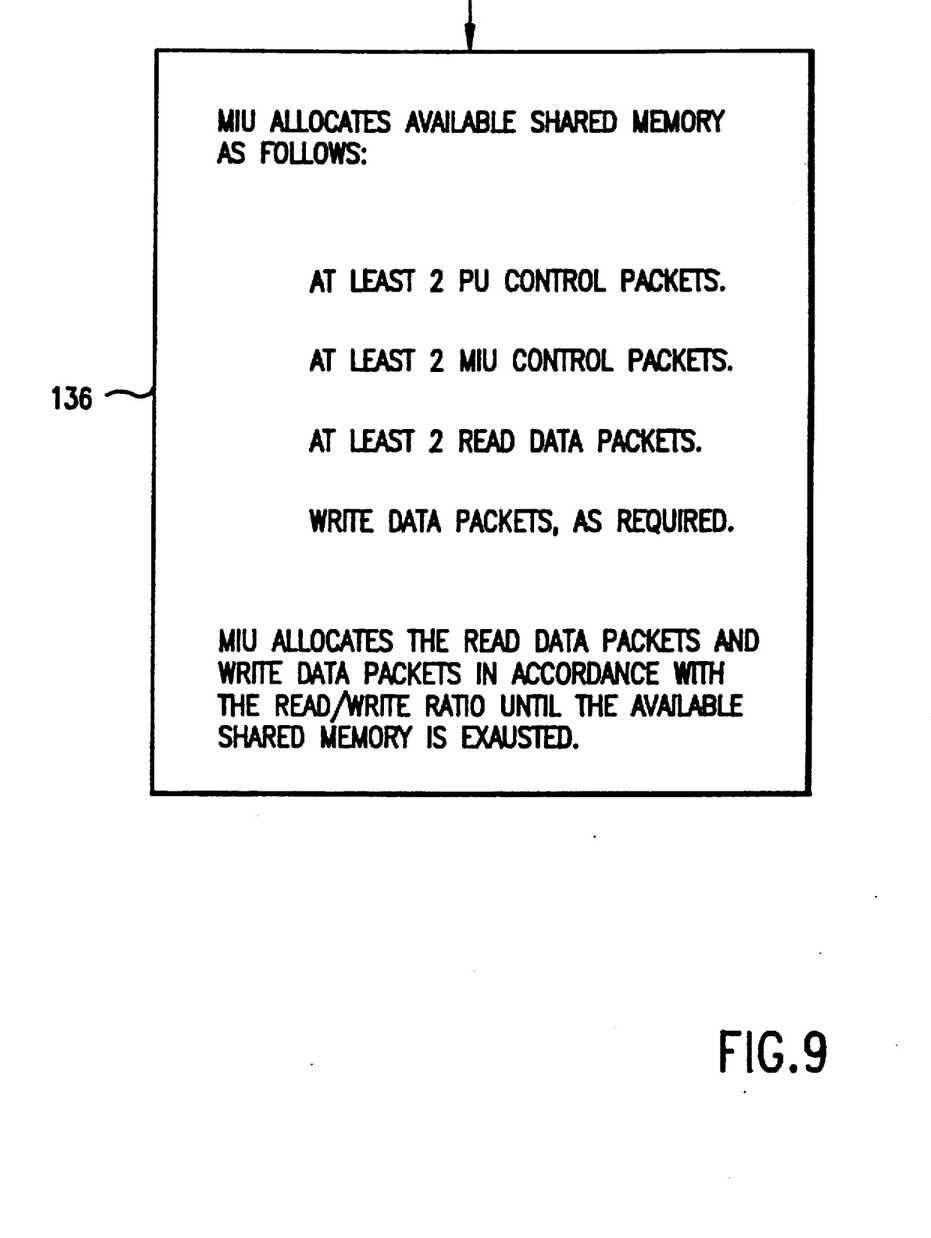
FIG. 9 is a high level flow diagram showing packet allocation within the shared memory.

Turning now to FIG. 8, MIU 52 now knows the following: the mix of read/write data packets; the minimum PU control packet buffer length; and the minimum MIU control packet buffer length. MIU 52 proceeds to determine the total shared memory installed on MIU 52 and uses that number as the starting value to determine the amount of shared memory available for packets (box 128). MIU 52 subtracts the amount of shared memory required for the mail boxes (box 130) and also subtracts the amount of shared memory required for dedicated MIU usage (box 132). The net remainder is the amount of shared memory available for packets. Finally, MIU 52 determines read and write data packet buffer lengths based on communication link requirements and characteristics. For instances, certain network protocols require minimum length data packets. Therefore, MIU 52 will adjust the data packet buffer lengths accordingly, in conformance with the network protocol requirements (box 134).

The last action of MIU 52 in the shared memory allocation routine is to actually assign the available shared memory. That assignment occurs as shown in box 136 in FIG. 9. To assure bi-lateral control communications between PU 40 and MIU 52, shared memory 60 is assigned at least two PU control packets and two MIU control packets. Further, at least two read data packets must be assigned and write data packets are assigned as required. Additional read and write data packets are then allocated within shared memory 60 in accordance with the read/write ratio until all available shared memory is exhausted. This procedure enables optimum allocation of shared memory 60 and provides the system with substantial flexibility in revising the allocation as conditions alter.

Figure 10:
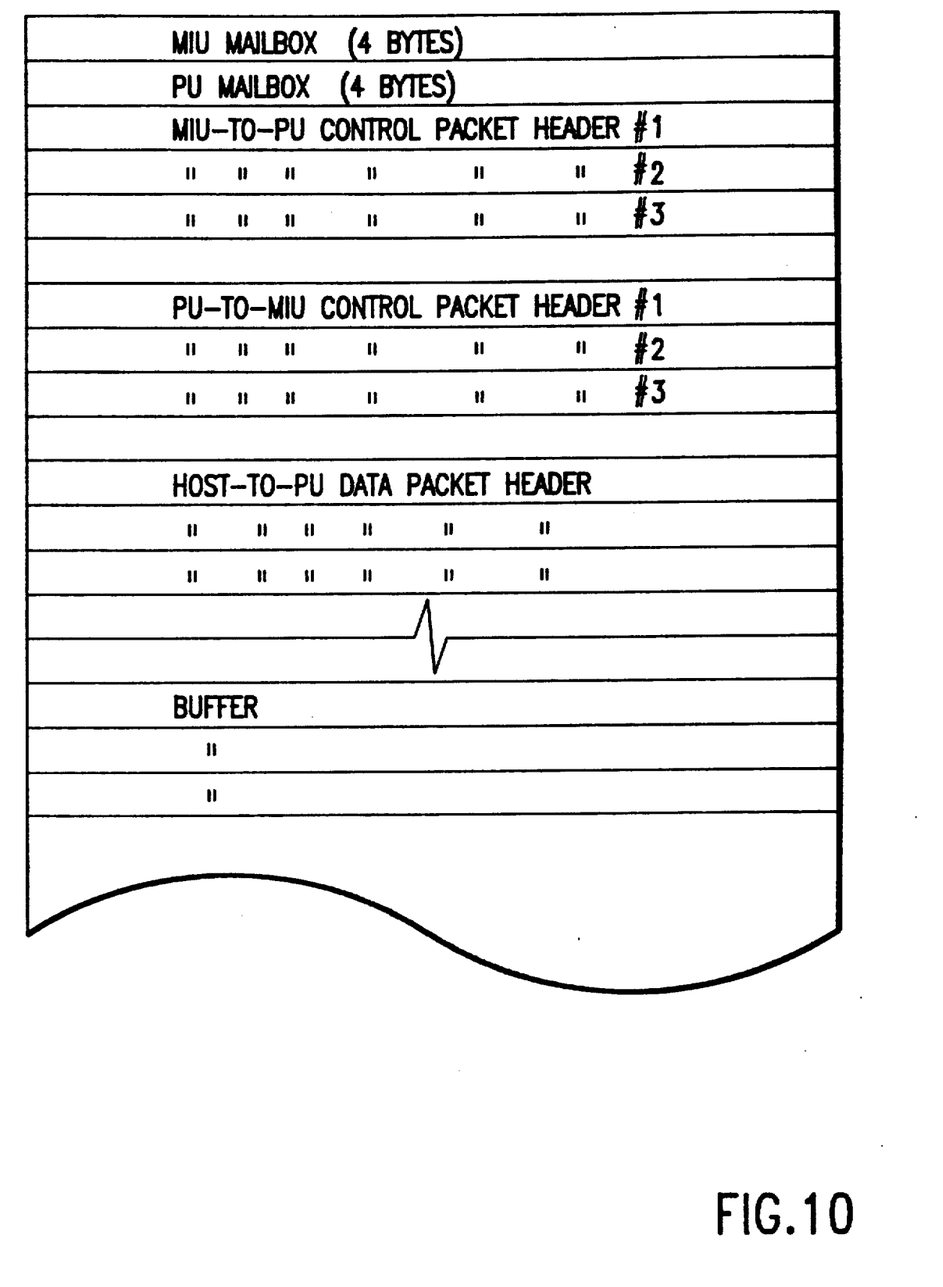
FIG. 10 is a schematic showing an exemplary allocation of shared memory, in accordance with the methods shown in FIGS. 5-9.

FIG. 10 shows a schematic of shared memory 60, after allocation and indicates the relationship of the various mailboxes, control packet headers, data packet headers and buffer regions. As will be recalled from FIG. 2, each packet includes a Start of Data field which indicates the initial address of valid data in the buffer associated with it. That address can be anywhere in shared memory 60.

MIU CONFIGURATION

Upon the initial operation of the system of FIG. 4, the MIU must be configured to comply with the communication link's requirements. For instance, if the interface is a serial data link, the baud rate, number of data bits per character, type of hand shaking, polarity of line, etc., must be prescribed. This system enables the user to configure the MIU strictly through interaction with display 44 and keyboard 46 within PU 40.

Initially, the user actuates its keyboard 46 to initiate a configuration request packet. This provides a means for PU 40 to configure MIU 52 using text prompts on display 44 instead of relying on switches located within the machine.

The configuration request packet is placed in shared memory 60 and its possession is passed to MIU 52. In response, microprocessor 56 passes questions and answers to PU 40 for display to the user via display 44. For example, a question will be presented on display 44 followed by one or more suggested configuration answers, any one of which may be selected by the user. When an answer is selected, the answer is passed by microprocessor 42 in PU 40 to shared memory 60. Then, microprocessor 56 requests microprocessor 42 to store the configuration data that results from the answer in non-volatile memory 48. This thereby allows an already-present non-volatile memory in PU 40 to be utilized for the I/O configuration data and prevents the need for duplicating that memory in MIU 52.

Before a user indicates via keyboard 46 that a configuration action is to occur, microprocessor 42 has previously passed an indication of the language that is employed by PU 40. For instance, if PU 40 is a printer, its instructions and other user interfaces may be in English, German, etc. Microprocessor 56 responds to the configuration request by presenting the questions and answers on display 44 in the same language.

The above described configuration function enables PU 40 to be used to configure the I/O function within MIU 52, without PU 40 having any knowledge of that function. As a result, PU 40 may interface with any MIU, and still be able to accomplish the configuration action, since the questions and answers are controlled by microprocessor 56 within MIU 52.

NETWORK PROTOCOL PACKET HEADER HANDLING

Referring back to FIG. 4, the system shown therein is often required to interface to a network that employs data that are "encapsulated" between network protocol headers and trailers. One objective of MIU 52 is to assure that PU 40 is completely oblivious to the particular protocol required by the connected network. Further, another objective of MIU 52 is to assure the most rapid handling of encapsulated data so as to be able to maintain optimum performance. As will be seen from the following description, the system shown in FIG. 4 transfers such encapsulated packets between link interface module 58 and shared memory 60 without having to perform any additional data copies.

Figure 11:
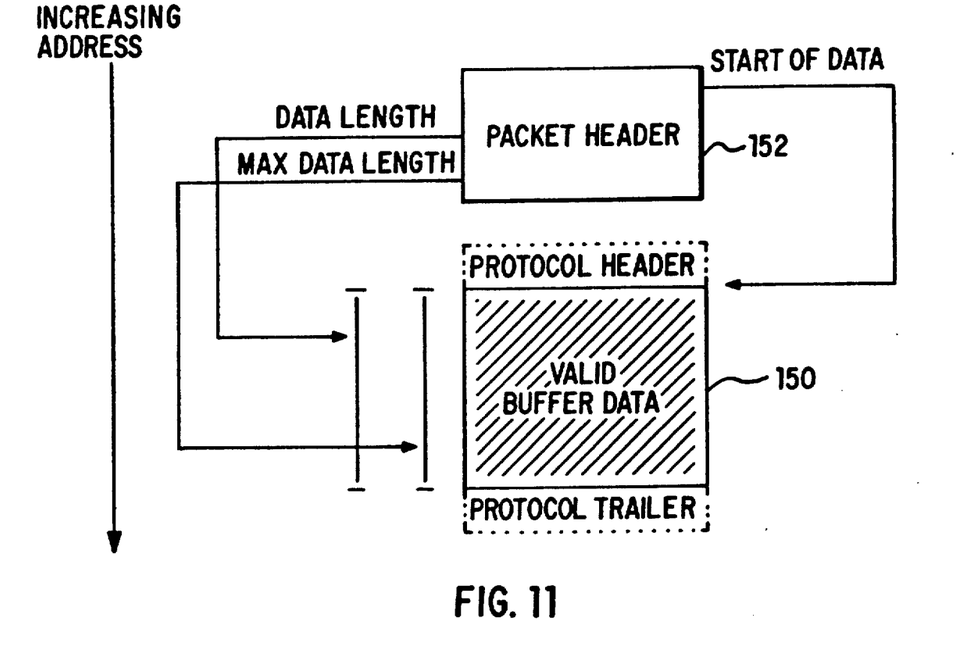
FIG. 11 a schematic of how fields in the invention's packet header refer to various sections of an associated packet buffer that contains network protocol headers and trailers.

A explained during the description of the allocation of shared memory 60, MIU 52 creates buffers that are large enough to accommodate the entire network packet (i.e., network protocol header+data+network protocol trailer). This is illustrated in FIG. 11 wherein buffer 150 (resident in shared memory 60), is shown including the entire packet a received from a network via link interface module 58. When a network packet is passed between link interface module 58 and shared memory 60, an interface packet header 152 is subsequently constructed by microprocessor 56 in shared memory 60. Interface packet header 152 takes the form shown in FIG. 2, however, there are three significant differences in the data that is indicated therein from that shown in the prior art packet header arrangement of FIG. 3. Specifically, the Start of Data field in packet header 152 indicates the initial address of valid buffer data within buffer 150 (and not the initial address of the network protocol header). The Data Length field indicates the length of valid buffer data only and excludes both the network protocol header and network protocol trailer (if any). Finally, the Maximum Data Length field indicates the maximum amount of valid buffer data that can be stored in buffer 150 and, excludes both network protocol header and trailer memory space.

As a result, when possession of a packet comprising packet header 152 and buffer 150 is passed to microprocessor 42 and it subsequently accesses that packet, it only sees the valid buffer data and the data fields defining same. As a result, microprocessor 42 never knows that protocol headers and trailers are present in buffer 150 and is able to ignore them in subsequent processing. Therefore, no additional action is required to "strip" network protocol headers and trailers from incoming network data as such "stripping" is handled automatically and "on-the-fly".

When PU 40 passes a write data packet to MIU 52, again, no copy of the outgoing data is required to append the network header and trailer. This is because microprocessor 56 has previously reserved space above and below the valid buffer data area 150 (FIG. 11) for insertion of outgoing network protocol header and trailer information. As a result, microprocessor 56 can directly insert that information into the network protocol header and trailer areas in shared memory 60. Then microprocessor 56 instructs DMA submodule 62 to transmit the network protocol header, valid buffer data, and network protocol trailer as a network packet over link 54.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a packet-based communications system for linking a peripheral unit (PU) to an external system via a communications link, a modular interface unit (MIU) coupled between said PU and said communications link, said MIU including memory shared by processors in both said PU and MIU, said system employing control packets, read packets for transferring data from said external system to said PU and write packets for transferring data from said PU to said external system, and performing a method for allocating space within said shared memory for storage of said read and write packets, said method comprising:

(a) determining a ratio of read to write packets required in the operation of said PU and whether said communications link will transmit write packets; and (b) ignoring the ratio determined in (a) if said communications link will not transmit write packets and, in such case, allocating space within said shared memory without regard to said determined ratio, but if said communications link will transmit write packets, allocating space within said shared memory for storage of said read and write packets in accordance with said determined ratio.

2. The method as recited in claim 1, further comprising the steps of:

(c) when said communication link will not transmit write packets and said ratio is ignored, allocating only read packets within said shared memory.

3. The method as recited in claim 2, wherein said MIU and PU transmit request control packets and receive response control packets, each said request control packet and response control packet comprising a header and a buffer, the method further comprising;

(d) determining a maximum buffer size required to accommodate (i) request control packets generated by said PU for transmission to said MIU, and (ii) response control packets received by said PU from said MIU, and a maximum buffer size required to accommodate (iii) request control packets generated by said MIU for transmission to said PU, and (iv) response control packets received by said MIU from said PU;

(e) choosing a first maximum buffer size sufficient to accommodate the larger of control packets (i) and (ii) and a second maximum buffer size sufficient to accommodate the larger of control packets (iii) and (iv); and (f) allocating in said shared memory, a minimum PU control packet buffer size equal to said first maximum buffer size and a minimum MIU control packet buffer size equal to said second maximum buffer size.

4. The method as recited in claim 3 where in step (d), said PU indicates maximum buffer sizes by examining the buffer needs of control packets (i) and (iv), and said MIU indicates maximum buffer sizes by examining the buffer needs of control packets (ii) and (iii).

5. The method as recited in claim 4, where in step (e) said MIU selects the larger of the maximum buffer sizes for control packets (i) and (ii) as said maximum buffer size, and the larger of the maximum buffer sizes for control packets (iii) and (iv) as said second maximum buffer size.

6. The method as recited in claim 5 comprising the further steps of:

(g) allocating a portion of said shared memory to accommodate at least two PU and two MIU request and response control packets, respectively, each control packet having at least a minimum buffer size as determined in step (f).

7. A method as recited in claim 6 further comprising the step of:

(h) allocating portions of said shared memory for use as PU and MIU mailboxes, said mailboxes employed to enable said PU and MIU to know when a packet transfer is available by an indication manifested in a said mailbox.

8. The method as recited in claim 7 wherein one of said steps (b) and (c) accomplishes an allocation of available shared memory subsequent to step (h).

9. The method as recited in claim 8 comprising the further steps of:
   (i) allocating shared memory addresses to said read, write, request control and response control packets; and
   (j) passing possession of read packets and MIU response control packets to said PU by manifesting an indication in a PU mailbox, which said PU removes to gain said possession, whereby said PU is enabled to access said read packets and MIU response control packets to accomplish further communications.

10. A system including a peripheral unit (PU) and a modular interface unit (MIU) that provides communications between said PU and other means, said MIU requiring initial configuration to enable said communications to said other means, said system comprising:
   a display and keyboard in said PU, said PU further including non-volatile memory associated with a PU processor;
   an MIU processor in said MIU, responsive to a user input to said keyboard indicating a configuration instruction, to access data stored in a memory associated with said MIU processor, so as to present a series of questions and answers to said display in said PU for viewing by said user;
   storage means in said MIU, accessible by both said MIU and said PU, for receiving signals resulting from a user's actuation of said keyboard indicating a selection of an answer, a said answer indicating a communication interface specification to be adhered to by said MIU; and
   means for storing said answers in said non volatile memory associated with said PU processor, whereby said answers become available for implementation by said MIU through said storage means.

11. The system as recited in claim 10, wherein said storage means in said MIU is a shared memory that is shared by said MIU processor and said PU processor, communications between said PU and MIU taking place through said shared memory.

12. The system as recited in claim 11, wherein said MIU is physically modular and user-removable from said system, whereby a new MIU can be substituted in the event said PU is to communicate with a new external system in lieu of said other means, said MIU including new questions and answers to enable a new MIU configuration, whereby said PU remains ignorant of said new external system but is enabled to communicate therewith through said new MIU.

13. The system as recited in claim 12, further comprising:
   means in said PU processor for determining and instructing said MIU processor what language said PU is configured to employ; and
   means in said MIU processor for providing said questions and answers in said language.

14. A packet-based system including a peripheral unit (PU) and a modular interface unit (MIU) for enabling communications between said PU and a communications network, said network imposing network protocol headers on data packets, said MIU including a shared memory accessible from both said MIU and said PU, said system further comprising:
   interface means in said MIU for receiving network packets consisting of a network protocol header, data, and a network protocol trailer from said network and storing said packets in said shared memory;
   processor means in said MIU for assembling an MIU header for each said received data packet, said MIU header including fields that indicate at least a start data address and a data length indication of data in a received data packet in said shared memory; and
   processor means in said PU for accessing said MIU header and for further accessing, in accordance with said field indications, only data commencing at said data address and extending for said data length, whereby said network protocol headers in said shared memory are ignored.

15. The packet-based system as recited in claim 14, wherein said network further imposes network protocol trailers on certain said packets, and wherein said data length field enables processor in said PU means to ignore a network trailer on any said data packet.

* * * * *